United States Patent
Hornberger

[11] Patent Number: 5,291,000
[45] Date of Patent: Mar. 1, 1994

[54] SNOW MELTING HEATER MAT APPARATUS

[76] Inventor: Ralph E. Hornberger, K-13 2304 Brownsville Rd., Langhorne, Pa. 19053

[21] Appl. No.: 840,047

[22] Filed: Feb. 24, 1992

[51] Int. Cl.⁵ .............................................. H05B 3/02
[52] U.S. Cl. ................................... 219/539; 219/213; 219/532; 219/548
[58] Field of Search ............... 219/213, 539, 525, 526, 219/550; 174/108; 248/206.5, 309.4

[56] References Cited

U.S. PATENT DOCUMENTS

| | | | |
|---|---|---|---|
| 1,734,605 | 8/1926 | Smith | 174/108 |
| 2,844,696 | 8/1957 | Custer | 219/541 |
| 4,258,248 | 3/1981 | Campo | 219/213 |
| 4,564,745 | 1/1986 | Deschenes | 219/213 |
| 4,967,057 | 10/1990 | Bayless et al. | 219/213 |

Primary Examiner—Bruce A. Reynolds
Assistant Examiner—Gregory L. Mills
Attorney, Agent, or Firm—Leon Gilden

[57] ABSTRACT

A snow mat series is positioned in surrounding relationship relative to an associated automotive vehicle to effect melting of snow surrounding the vehicle to accommodate access thereto. The apparatus is positioned along a portion of the vehicle as required. The mats may be formed of a rigid housing construction or of a cellular construction that permits the melting snow to be directed through the cellular matrix of each mat.

3 Claims, 6 Drawing Sheets

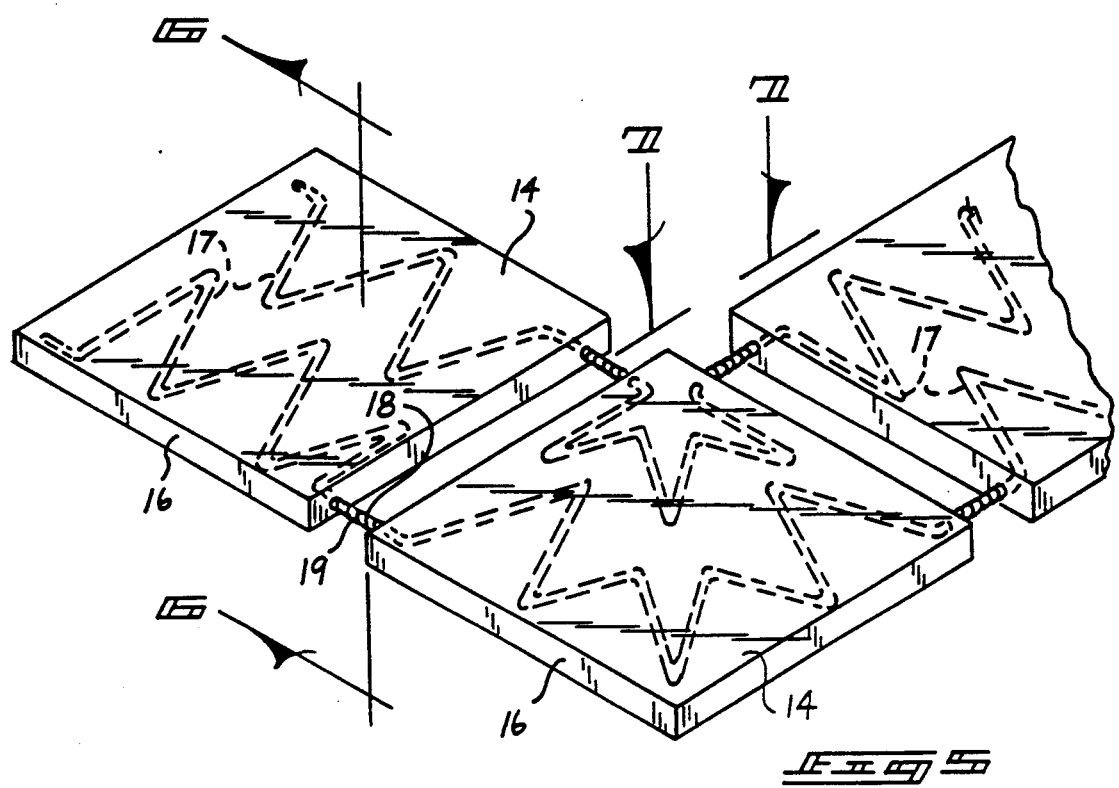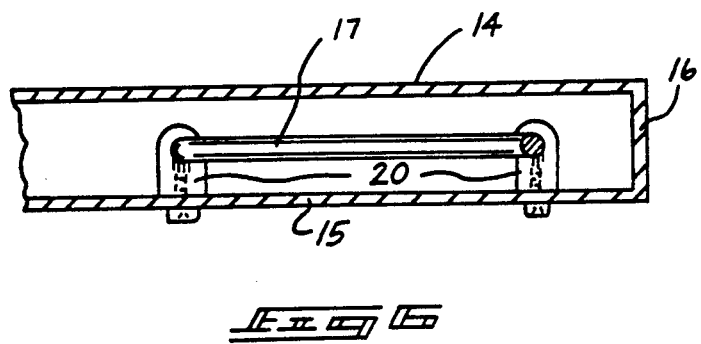

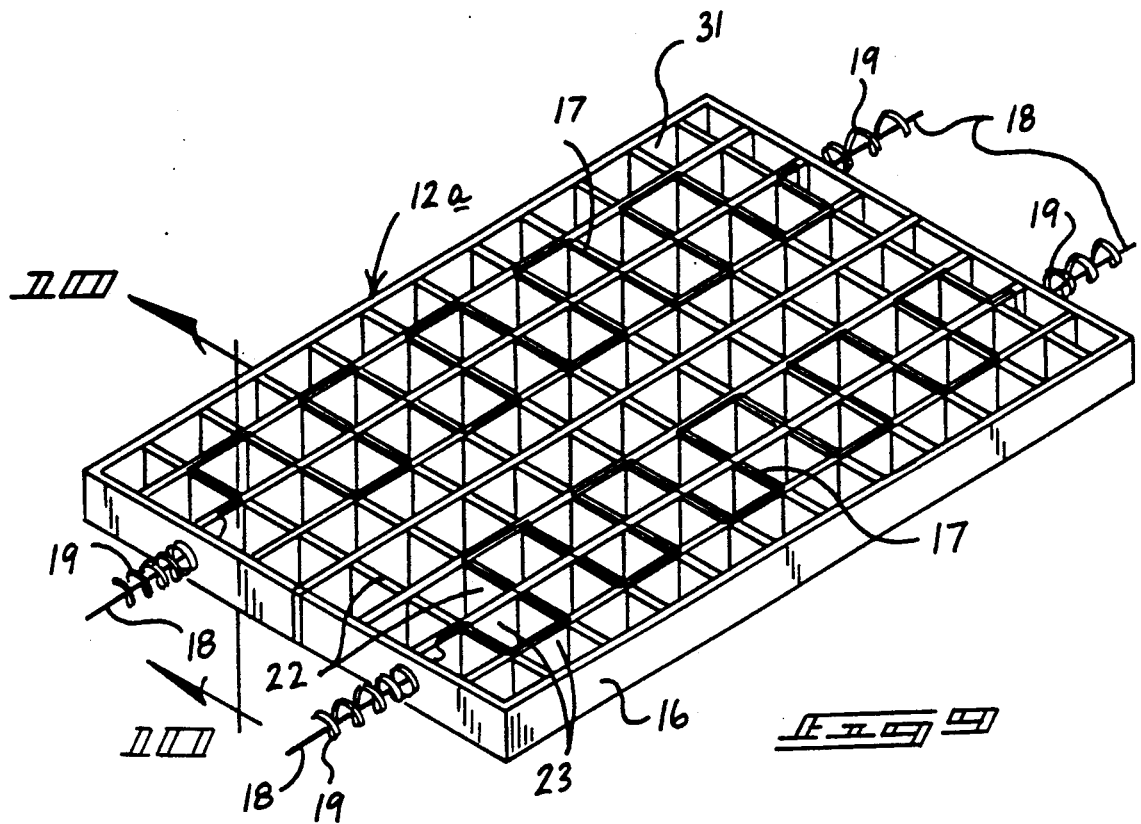
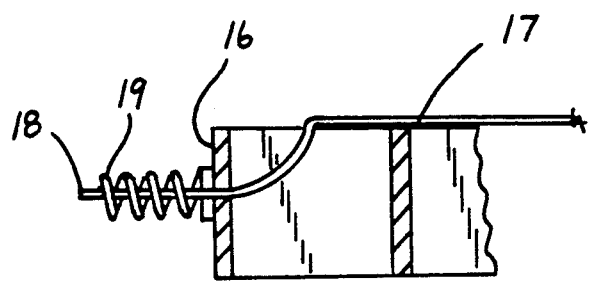

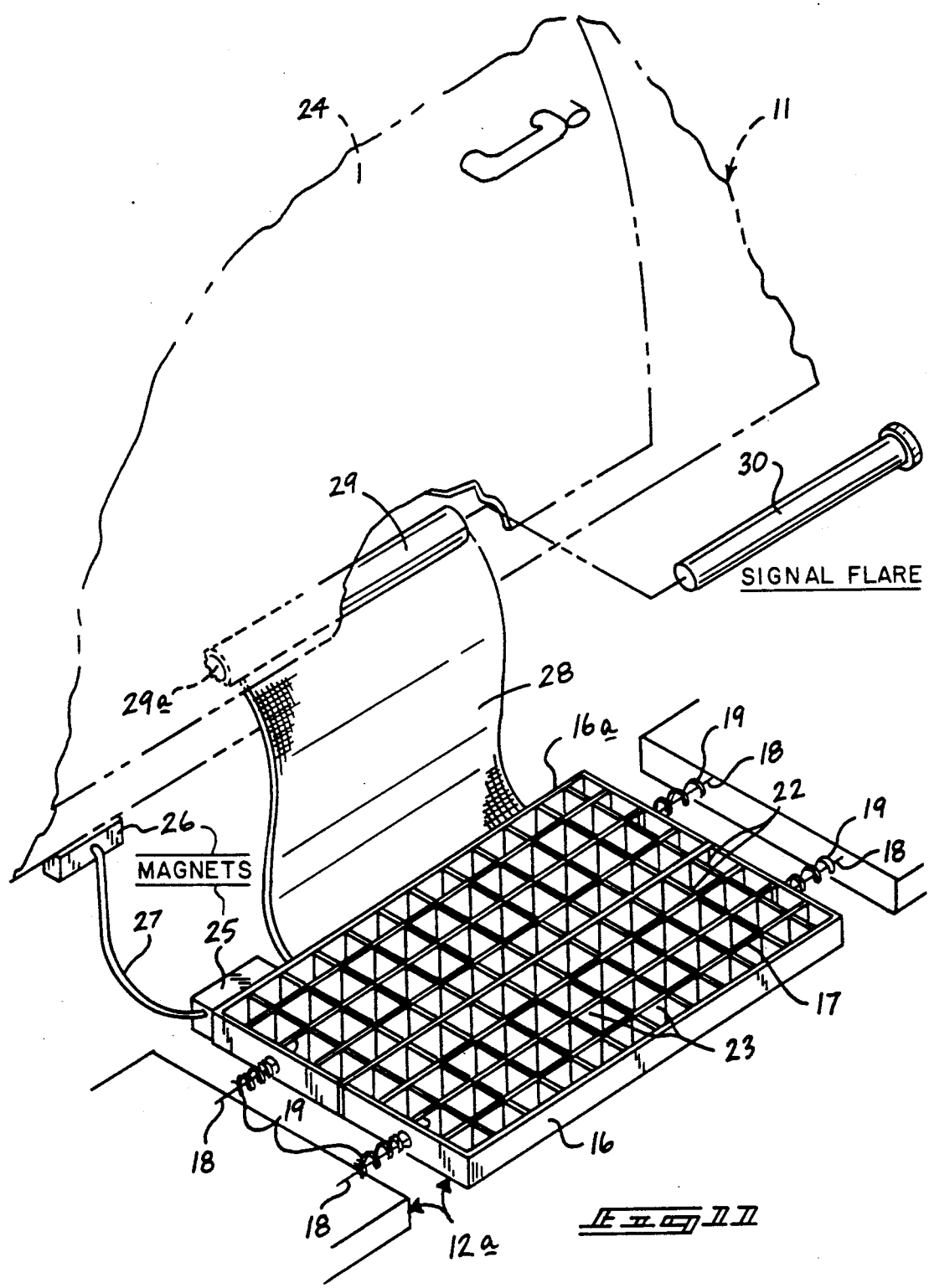

SNOW MELTING HEATER MAT APPARATUS

BACKGROUND OF THE INVENTION

1. Field of the Invention

The field of invention relates to snow melting apparatus, and more particularly pertains to a new and improved snow melting heater mat apparatus wherein the same is arranged to be positioned adjacent a vehicle permitting ease of access to the vehicle.

2. Description of the Prior Art

Snow melting apparatus in mat construction has been utilized in the prior art. The access to vehicles, particularly during snow storms, is awkward, difficult, and even dangerous due to melting and freezing of snow. The instant invention attempts to provide an organization to melt and direct snow through a cellular matrix of the mat structures to provide for a grid construction to permit a relatively non-slip surface, as well as directing melting snow therethrough. The prior art has addressed snow melting mats of various types and such mats are set forth in the U.S. Pat. Nos. 4,976,057; 3,976,855; 4,258,248; and 4,314,772.

Accordingly, it may be appreciated that there continues to be a need for a new and improved snow melting heater mat apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of snow melting mat apparatus now present in the prior art, the present invention provides a snow melting heater mat apparatus wherein the same is arranged to melt and direct snow through the mat structure to provide ease of access to an associated vehicle. As such, the general purpose of the present invention, which will be described subsequently in greater detail, is to provide a new and improved snow melting heater mat apparatus which has all the advantages of the prior art snow melting mat apparatus and none of the disadvantages.

To attain this, the present invention provides a now mat series positioned in surrounding relationship relative to an associated automotive vehicle to effect melting of snow surrounding the vehicle to accommodate access thereto. The apparatus is positioned along a portion of the vehicle as required. The mats may be formed of a rigid housing construction or of a cellular construction that permits the melting snow to be directed through the cellular matrix of each mat.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved snow melting heater mat apparatus which has all the advantages of the prior art snow melting mat apparatus and none of the disadvantages.

It is another object of the present invention to provide a new and improved snow melting heater mat apparatus which may be easily and efficiently manufactured and marketed.

It is a further object of the present invention to provide a new and improved snow melting heater mat apparatus which is of a durable and reliable construction.

An even further object of the present invention is to provide a new and improved snow melting heater mat apparatus which is susceptible of a low cost of manufacture with regard to both materials and labor, and which accordingly is then susceptible of low prices of sale to the consuming public, thereby making such snow melting heater mat apparatus economically available to the buying public.

Still yet another object of the present invention is to provide a new and improved snow melting heater mat apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is an isometric illustration of section 5, as set forth in FIG. 3.

FIG. 6 is an orthographic view, taken along the lines 6—6 of FIG. 5 in the direction indicated by the arrows.

FIG. 9 is an isometric illustration of a cellular mat structure utilized by the invention.

FIG. 10 is an orthographic view, taken along the lines 10—10 of FIG. 9 in the direction indicated by the arrows.

FIG. 11 is an isometric illustration of a modified organization, as utilized by the invention.

DESCRIPTION OF THE PREFERRED EMBODIMENT

Figure 1:
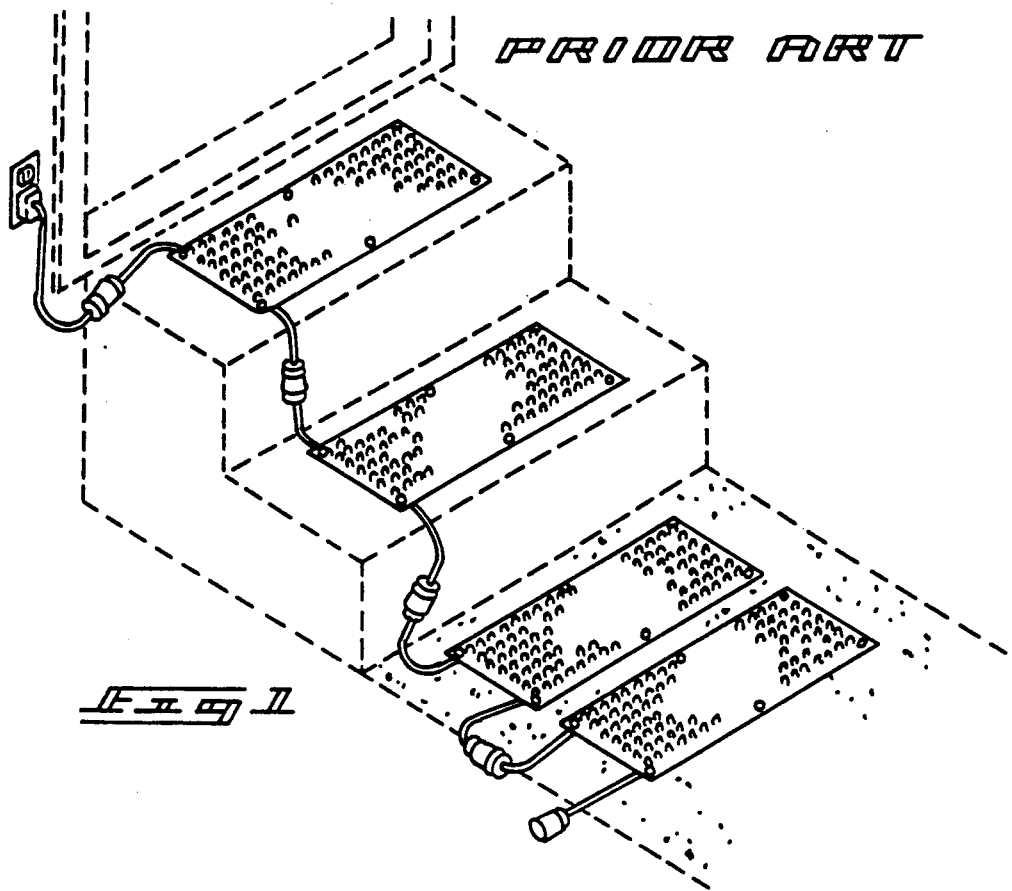
FIG. 1 is an isometric illustration of a prior art snow melting mat structure.

With reference now to the drawings, and in particular to FIGS. 1 to 11 thereof, a new and improved snow melting heater mat apparatus embodying the principles and concepts of the present invention and generally designated by the reference numeral 10 will be described.

Figure 2:
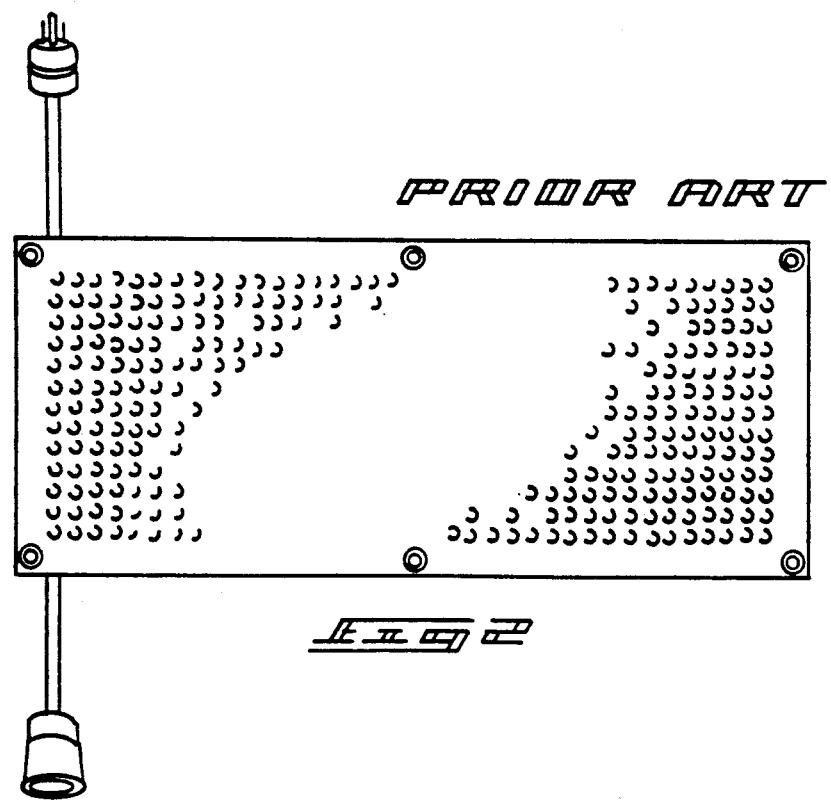
FIG. 2 is an orthographic top view of the mat structure of FIG. 1.
Figure 3:
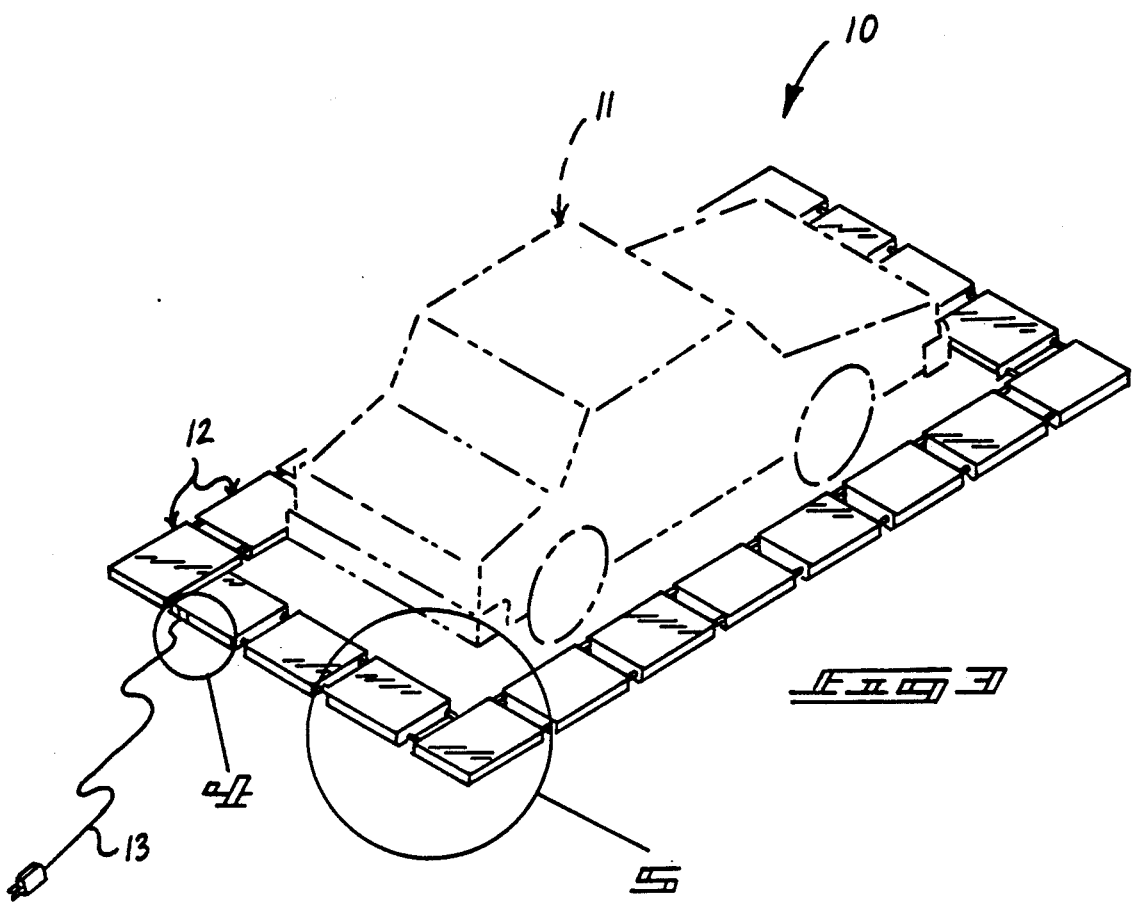
FIG. 3 is an isometric illustration of the instant invention.
Figure 4:
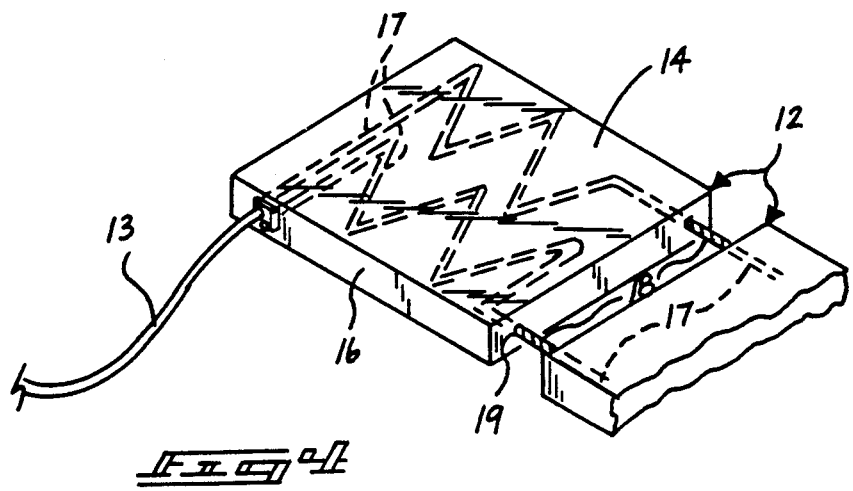
FIG. 4 is an isometric illustration of section 4, as set forth in FIG. 3.
Figure 7:
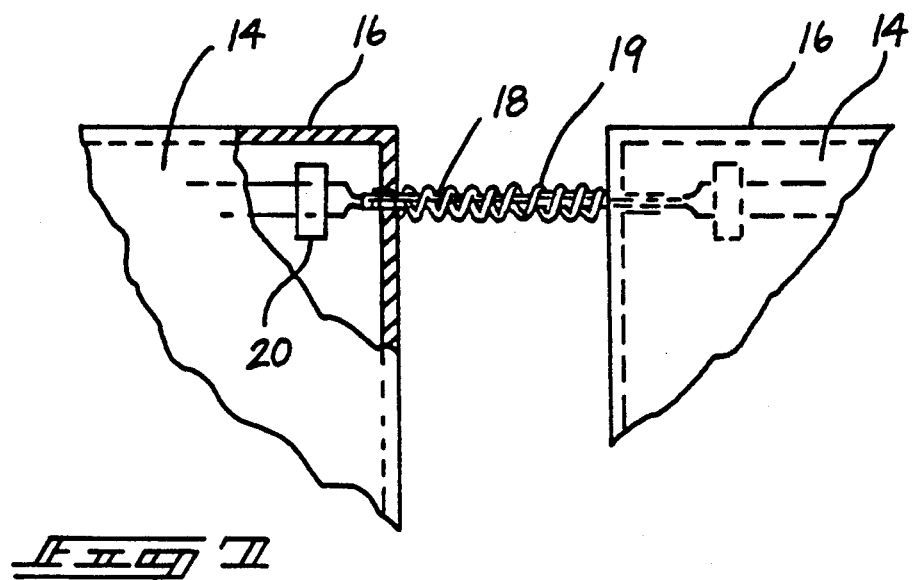
FIG. 7 is an orthographic view, taken along the lines 7—7 of FIG. 5 in the direction indicated by the arrows.

The FIGS. 1 and 2 illustrate a prior art heated mat structure, as set forth in the U.S. Pat. No. 4,967,057, illustrating the utilization of a plurality of interconnected mat members whose mat are of a flexible solid configuration.

Figure 8:
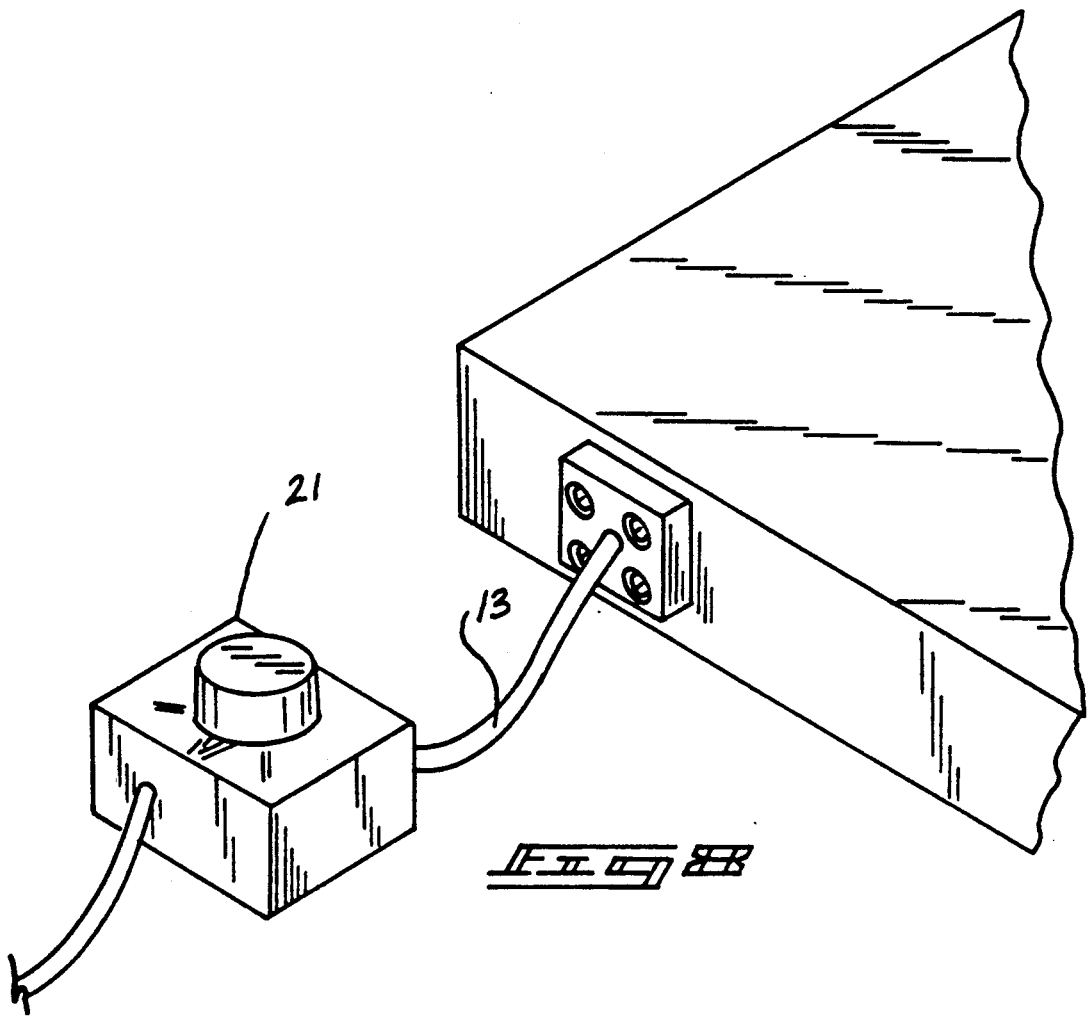
FIG. 8 is an isometric illustration of a rheostat structure utilized by the instant invention.

More specifically, the now melting heater mat apparatus 10 of the instant invention essentially comprises a plurality of rigid heating mats 12 positioned in electrical communication relative to one another positioned adjacent an associated vehicle 11, with the heating mats in electrical communication to an electrical power supply 13 directing electrical energy to the heating mats 12. The heating mats 12 are formed as a rigid housing, including a top wall 14 spaced from a bottom wall 15, with a continuous side wall 16. A plurality of serpentine resistance heating members 17 are directed throughout the heating mats 12 between the top wall and the bottom wall 14 and 15 respectively. Flexible connector cables 18 are directed between adjacent side walls 16 of adjacent heating mats 12 to effect electrical communication of the heating members 17 of adjacent heating mats 12. The flexible connector cables 18 each includes a surrounding coil spring 19, with each end of the coil spring 19 mounted to adjacent side walls 16 of adjacent mats 12. The heating members 17 are mounted within insulator posts 20, in a manner as illustrated in FIG. 6. Further, a rheostat 21, as illustrated in FIG. 8, is selectively utilized to provide for energy selection and degree of heating within the associated mats 12.

The mats 12a set forth a modified mat construction of a cellular type configuration. The modified mats 12a, as illustrated in the FIG. 9 for example, includes orthogonally intersecting plural first and second wall members 22 and 23. The first wall members 22 are arranged parallel relative to one another intersecting orthogonally parallel second wall members 23 to form cellular openings 31 in a matrix configuration, in a manner as illustrated in the FIG. 9. The cellular openings 31 are directed between the top and bottom wall portions directed therethrough of the modified mats 12a. Further, the heat members 17 are directed along the top of each of the second wall members 22 and 23 in a serpentine configuration, as illustrated in FIG. 9.

The FIG. 11 illustrates the further use of a first magnetic mounting block 25 magnetically adhered to a ferrous metallic side wall 16a utilizing a tether cable 27 for securement to a second magnetic mounting block 26 for magnetic securement and positioning of the heating mats 12a relative to the vehicle door 24, as well as the vehicle body 11. The proper spacing is thereby afforded of the heating mats 12a in this manner. Further, a flexible securement web 28 is secured at a first end to the side wall 16, and at a second end to a rigid securement web tube 29 formed with a tubular cavity 29a coextensively therethrough to receive a signal flare cylinder 30 that may be utilized in matters of emergency to indicate danger or orientation of the vehicle in particularly deep snow falls.

It should be further noted, as illustrated in FIG. 11, that the rigid securement web tube 29 is arranged for reception within the vehicle 11 between the vehicle 11 body and the associated door 24 to discourage unauthorized removal of the apparatus relative to the vehicle 11 during use.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A snow melting heater mat apparatus, comprising, a plurality of rigid heating mats, and an electrical power supply directed to a first of the rigid heating mats, the rigid heating mats arranged in a serial aligned orientation relative to one another to define an integral surrounding side wall, with each heating mat including a plurality of serpentine resistance heating members secured to each heating mat within the side wall of each heating mat, and a flexible connector cable directed between adjacent heating mats, with the flexible connector cable in electrical communication between the serpentine heating members of the adjacent heating mats, and each flexible connector cable includes a coil spring arranged in surrounding relationship relative to each connector cable, with each coil spring mounted at each distal end to the adjacent heating mats, and each heating mat includes a plurality of parallel first wall members orthogonally intersecting a plurality of second wall members defining cellular openings directed in a parallel relationship within the surrounding side wall, with the serpentine heating members mounted to upper distal ends of at least one of the first wall members and to at least one of the second wall members, and a first magnetic mounting block and the surrounding side wall is formed of a ferrous rigid material, and a tether cable secured to the first magnetic mounting block, and a second magnetic mounting block secured to said tether cable spaced from the first magnetic mounting block for securement to an associated vehicle to effect spacing of the heating mat relative to the vehicle.

2. An apparatus as set forth in claim 1 including a flexible securement web secured at a first end to the continuous side wall of at least one of the heating mats, and a second distal end of the flexible securement web including a rigid securement tube secured coextensively to the second end of the flexible securement web.

3. An apparatus as set forth in claim 2 wherein the rigid securement web tube includes a tube cavity contained coextensively therethrough, with a signal flare cylinder slidably mounted within the tube, with the tube arranged for positioning within the associated vehicle between the vehicle and a door of the vehicle.

* * * * *